(12) United States Patent
Wang et al.

(10) Patent No.: US 8,093,967 B1
(45) Date of Patent: Jan. 10, 2012

(54) MEMS HIGH SPEED SWITCHING CONVERTER

(75) Inventors: Weidong Wang, Oldsmar, FL (US); Shinzo Onishi, Seminole, FL (US)

(73) Assignee: University of South Florida, Tampa, FL (US)

( * ) Notice: Subject to any disclaimer, the term of this patent is extended or adjusted under 35 U.S.C. 154(b) by 1252 days.

(21) Appl. No.: 11/687,206

(22) Filed: Mar. 16, 2007

Related U.S. Application Data

(60) Provisional application No. 60/767,304, filed on Mar. 16, 2006.

(51) Int. Cl.
*H01H 51/22* (2006.01)
(52) U.S. Cl. .......................... 335/78; 200/181
(58) Field of Classification Search ............. 335/78; 200/181
See application file for complete search history.

(56) References Cited

U.S. PATENT DOCUMENTS

| | | | |
|---|---|---|---|
| 4,406,975 A * | 9/1983 | Nixon .................. | 315/209 R |
| 5,943,223 A * | 8/1999 | Pond .................. | 363/53 |
| 6,811,133 B2 | 11/2004 | Miles | |
| 2004/0080964 A1* | 4/2004 | Buchmann .................. | 363/60 |
| 2005/0173234 A1 | 8/2005 | Nielson et al. | |

OTHER PUBLICATIONS

Becker, M., Benecke, W., Hannemann, B., and Henning, T. 2003. Electrostatic Beam Actuator for Switching Applications Fabricated by Ni-microelectroplating and Thermal Postprocessing. Proc. SPIE—The Internation Soceity for Optical Engineering. vol. 4981. pp. 71-82.

Gross, S.J., Tadigadapa, S., and Jackson, T.N. 2003. "Lead-Zirconate-Titanate-Based Piezoelectric Micromachined Switch" Applied Physics Letters. vol. 83, No. 1. pp. 174-176.

Peroulis, D., Sarabandi, K., and Katehi, L.P.B. 2002. "Low Contact Resistance Series MEMS Switches" IEEE MTT-S International Microwave Symposium Digest, vol. 1, pp. 223-226.

Pacheco, S. 2004. "Design and Fabrication of Low-Actuation Voltage K-Brand MEMS Switches for RF Applications" Univ. of Michigan. vol. 65-02B. pp. 934.

Nishijima, N, Hung, J, and Rebeiz, G.M. 2004. "A Low-Voltage High Contact Force RF-MEMS Switch" IEEE MTT S Int Microwave Symp Dig, vol. 2, pp. 577-580.

Lee, H., Coutu Jr., R.A., Mall, S. and Kladitis, P.E. 2005. "Nanoindentation Technique for Characterizing Cantilever Beam Style RF Microelectromechanical Systems (MEMS) Switches" J Micromech Microengineering. vol. 5, #6, 99. 1230-1234.

* cited by examiner

*Primary Examiner* — Bernard Rojas
(74) *Attorney, Agent, or Firm* — Molly L. Sauter; Smith & Hopen, P.A.

(57) ABSTRACT

The present invention provides a DC high voltage converter having an oscillator driver, main switch array and topological enhanced capacitors. The switch array utilizes MEM cantilevers and topological capacitors for charge storages for the generation of a high voltage output from a low voltage input utilizing the chattering motion of the cantilever.

16 Claims, 9 Drawing Sheets

(a) PARALLEL SERIES CONVERTER (b) CHARGE TRANSFER CONVERTER (a) CHARGE TRANSFER CONVERTER  (b) ONE SOURCE TRANSFER CONVERTER WITH AN ADDITION SW (a)

(b)

MEMS HIGH SPEED SWITCHING CONVERTER

CROSS REFERENCE TO RELATED APPLICATIONS

This application claims priority to currently pending U.S. Provisional Patent Application 60/767,304, entitled, "MEMS High Speed Switching Converter", filed Mar. 16, 2006, the contents of which are herein incorporated by reference.

BACKGROUND OF THE INVENTION

The present invention relates to the field of micro-mechanical switching converters using micro-mechanical transducers. Micro-mechanical switching circuits provide many applications such as voltage converters, switching regulators, phase matching, etc. Mechanical and electronic switching circuits are widely used and micro-mechanical switching circuits can additionally be complimented with traditional switching devices.

MEMS switching converters are known in the art. The many benefits of a MEMS implementation for switching converters include; no voltage loss due to p-n junction, low ohm losses, radiation resistance, ability to convert voltage up and down, prolonged operation using hermetic seal with He gas, prolonged operation using Ir contacts, ability to charge all capacitors simultaneously or based on charge transfer, only simple vibrations necessary to drive the circuits, need for two power supplies for some converters. In the art, large surface area, low tolerance valued capacitors, such as topological capacitors, are integrated to realize these MEMS switching converters.

A prior art switching circuit configuration is illustrated with reference to FIG. 1. FIG. 1(a) illustrates a parallel-series converter as is known in the art. In this embodiment, the input and the output voltages are 1.5V and 12V, respectively. FIG. 1(b) illustrates a charge transfer converter as is known in the art which also has an input voltage of 1.5V and an output voltage of 12V. With reference to FIG. 2, in these embodiments, the required capacitor value for the charge transfer converter, operating frequency 1 kHz at 10% ripple, will be 1.5 nF to realize 12V from a 1.5V supply. In these prior art embodiments, solid-state switches are employed, such as transistors or diodes.

In a thermally activated cantilever switch, a low driving voltage source is required. However, with a low driving voltage source, the operating frequency of the cantilever switch is low. While the heating process for the thermal activation is relatively fast, the cooling process is relatively slow. As such, the overall switching operation frequency for the thermal activated cantilever remains low thereby limiting the use of MEMS switches in high frequency applications Accordingly, what is needed in the art is a MEMS switch that is operable at a high frequency while also utilizing a low voltage driving source. As such, it would be advantageous in the art to have an efficient DC to DC high voltage converter that requires only simple vibrations to drive the circuits.

SUMMARY OF INVENTION

A DC to DC high voltage converter in accordance with the present invention has three parts; an oscillator driver, main switch array or voltage multiplier, and an array of topological capacitors.

A microelectromechanical (MEMS) DC high voltage converter in accordance with the present invention, includes an oscillator driver that provides an actuating vibration, and a voltage multiplier further comprising a plurality of MEMS switches, each of the plurality of MEMS switches activated by the vibration of the oscillator driver and a plurality of charge storage capacitors coupled to the plurality of MEMS switches to provide a high voltage output from an input voltage received at the oscillator driver.

In a particular embodiment, the oscillator driver of the present invention includes at least one MEMS cantilever having a charging contact and a discharging contact, the charging contact and the discharging contact are coupled to an input voltage source supplying the input voltage.

In a specific embodiment, the MEMS cantilevers are fabricated using a metal cantilever beam supported by a dielectric cantilever beam. The dielectric cantilever beam is first positioned on a platinum pad formed on a silicon substrate.

The oscillator driver in accordance with the present invention may also actuate the main switch utilizing a resistor coupled in series between the cantilever and the input voltage source to generate the actuating vibration or a MEMS symmetric torsion device to generate the actuating vibration.

The main switch, or voltage multiplier of the present invention, further includes a plurality of MEMS cantilever switches coupled to receive the actuating vibration from the oscillator driver and a plurality of topological capacitors to store the charge generated by the switching motion of the cantilevers.

The converter in accordance with the present invention will be used as a high voltage supply from an environmentally available low voltage source. The device performs similarly to a wall transformer, but supplies high voltage DC using a low voltage DC source without any transistors or diodes, just mechanical switches only. Accordingly, the device can be used as a remote-sensing power supply without any p-n junction or magnetic elements required. The conversion efficiency is very high. The device can be employed whenever electrical power is required and the device will supply electricity from an environmental cell at low voltage.

The switching converter in accordance with the present invention is operable to respond to any vibrations, including those due to wave and walk motions. However, these vibrations due to wave and walk motions are also relatively slow, as such, the frequencies of the motions also remain very low. To operate MEMS switching converters effectively, the operating frequencies should be high. The switching converter in accordance with the present invention allows for increased operating frequencies of the converter, thereby solving the most fundamental problem with cantilever switching converters known in the art.

In accordance with the present invention natural vibration, or chattering, has been shown to be very useful in enhancing operating frequencies of the converter. The present invention provides an innovative design utilizing the previously unused chattering motions in the operation of the converter to generate a high voltage from a simple low voltage source. The operating frequency can be as high as the natural resonant frequency of the mechanical cantilever structure, such as >10 kHz, depending upon design, compared to conventional thermal actuation operating frequency of about <1 kHz. The device can be employed whenever electrical power is required and the device will supply electricity from an environmental cell at low voltage.

In accordance with the present invention, a microelectromechanical (MEMS) high speed DC converter includes an actuator that provides an actuating vibration having a chattering vibration and a voltage multiplier further comprising at least one MEMS cantilever switch, the at least one MEMS cantilever switch being activated by the vibration of the actuator and the chattering vibration and at least one charge storage capacitor coupled to the at least one MEMS cantilever switch to provide a voltage output from the actuating vibration and chattering vibration of the actuator.

In accordance with specific embodiments of the invention, the actuator may be a thermally activated actuator, a mechanical actuator, an electrical actuator, a walking motion actuator or a wave motion actuator. Additional actuators are within the scope of the present invention.

In a particular embodiment, the actuator includes a MEMS cantilever switch having a cantilever beam positioned on a silicon substrate. The actuator further includes a Ni—Cr heater element positioned on the cantilever beam to initiate the actuation of the beam. In a particular embodiment, the cantilever beam is a SiNx cantilever. Upon actuation the cantilever beam switches between a pair of lower platinum contacts and a pair of upper platinum contacts and the resulting chatter of the actuation is used to generate a high frequency switching motion. The switching motion causes the topological capacitors of the converter to store charges and generate a higher DC voltage output. As such, the present invention provides an innovative design utilizing the previously unused chattering motions in the operation of the converter to generate a high voltage from a simple low voltage source.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

A DC to DC high voltage converter in accordance with the present invention consists of three fundamental elements, including an oscillator driver, a main switch array and an array of capacitors. The capacitors are used for charge storages for high voltage generation.

Figure 3:
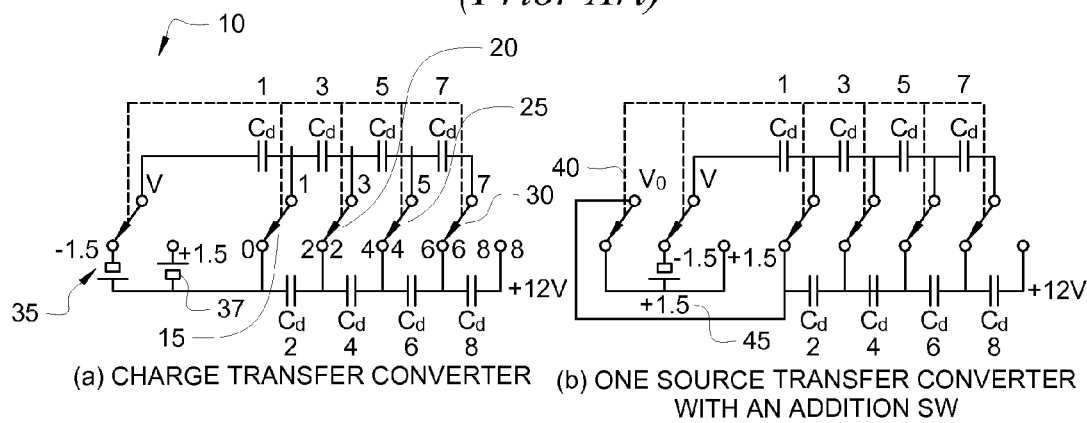
FIG. 3 is a diagrammatic view of a charge transfer circuit employing switches in which is currently known in the art.

With reference to FIG. 3(a), a high voltage converter circuit 10 as is known in the art is illustrated wherein the switches 15, 20, 25 and 30 of the main switch array operate as a Cockcroft-Walton circuit. A Cockcroft-Walton (CW) circuit is basically a voltage multiplier that converts AC or pulsing DC electrical power from a low voltage level to a higher DC voltage level. A Cockcroft-Walton circuit known in the art is comprised of a voltage multiplier ladder network of capacitors and diodes. Using only these capacitors and diodes a Cockcroft-Walton circuit can step-up relatively low voltages to extremely high values, while eliminating the need for heavy core transformers. In this embodiment, the main switch consists of 5-circuits 2 poles. In such a circuit, the voltage across each stage of the cascade is equal to twice the peak input voltage 35 or 37, as such, the circuit requires relatively low cost components and is easy to insulate. FIG. 3(b) illustrates a similar circuit to that of FIG. 3(a), wherein an additional switch 40 is provided to allow the use of a single source input voltage 45.

In accordance with an embodiment of the present invention, a DC to DC high voltage converter circuit is implemented by replacing the diodes of the Cockcroft-Walton circuit with MEMS switches. Topological capacitors are then integrated for charge storages for high voltage generation.

Figure 4:
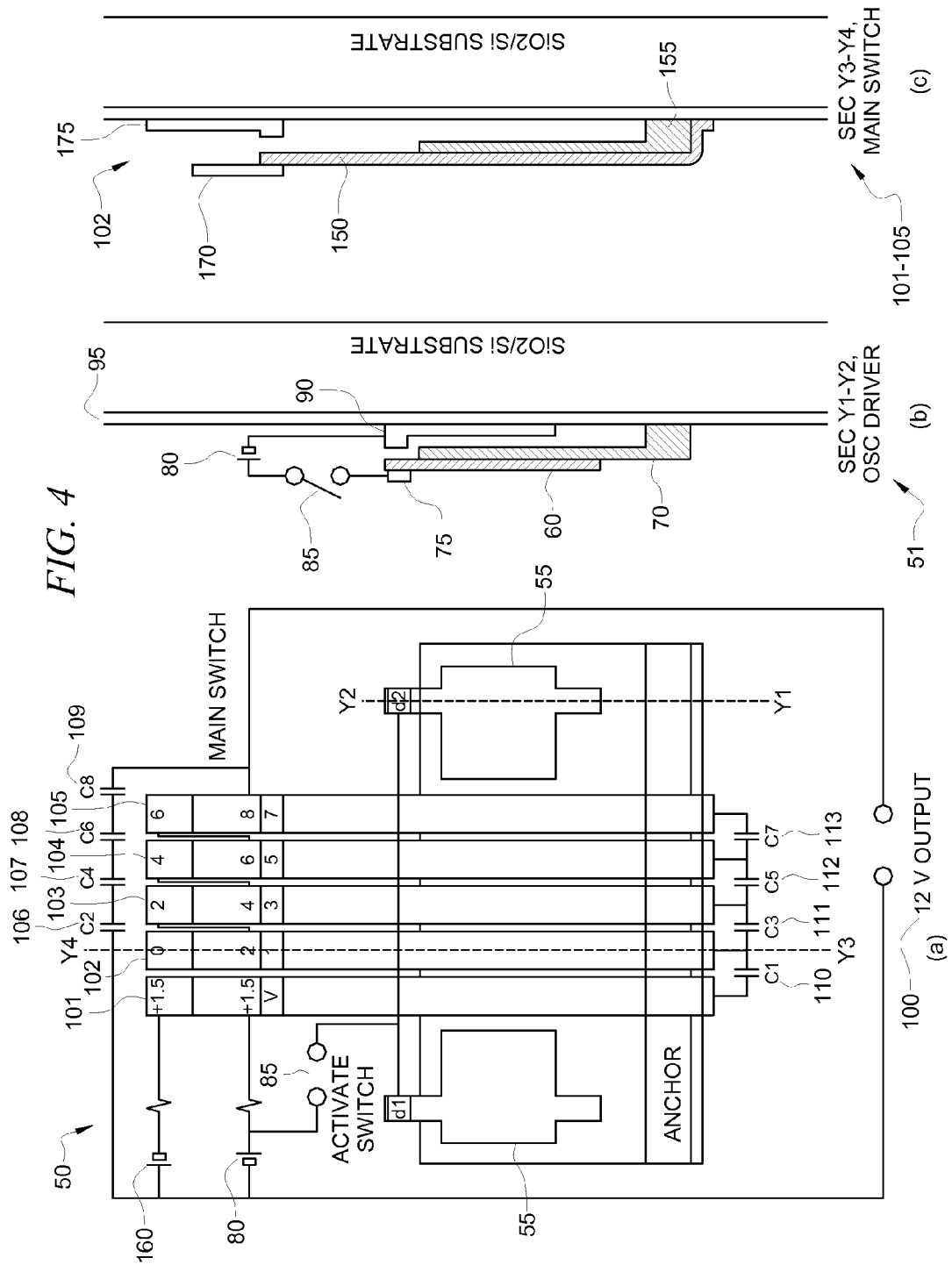
FIG. 4 is a diagrammatic view of (a) a DC to DC transformer, (b) a cross-sectional view of the oscillator driver cantilever of the DC to DC transformer, and (c) a cross-sectional view of a main switch cantilever in the voltage multiplier circuit in accordance with the present invention.

With reference to FIG. 4(a), an embodiment of the DC to DC transformer 50 in accordance with the present invention is illustrated. The transformer 50 includes a self-oscillation driver having a large area of platinum (Pt) coating 55, the large conductor thereby forming a capacitive element. The MEMS cantilever switch 60, is then positioned on top of the Pt coating 55. To balance the motion of the microelectromechanical circuit, two oscillation drivers on each side are activated. In a particular embodiment the drivers are located at both sides of the main switch array. Utilizing two drivers provides stable switching motion of the cantilevers 60, 65.

To more clearly illustrate the oscillator driver of the present invention, a cross-section (Y1-Y2) of the oscillator driver circuit 51 is shown with reference to FIG. 4(b). As shown in FIG. 4(b) a metal cantilever 60 is supported by a dielectric cantilever 70. The cantilever 60 is normally "on" with the upper metal contact 75. A normally "on" contact supplies 1.5V from a 1.5V supply 80 via a demand activated switch 85.

When the demand activated switch 85 is turned on, the upper metal contact 75 charges the cantilever electrode 60 through the power source 80. The charged cantilever electrode 60 is then is attracted by the bottom electrode 90 on the substrate 95 until the cantilever touches the bottom electrode 90. When the cantilever 60 contacts the bottom electrode 90, the charge on the cantilever 60 is discharged and the cantilever springs back and contacts the upper electrode 75 and begins recharging though the power source 80. This motion of the cantilever 60 repeats continuously and activates the main switches 101, 102, 103, 104, 105 of the circuit until the activate switch 85 is turned off. When the activate switch 85 is turned off, the circuit consumes no power. The oscillator driver 51 is integrated with the main switches 101-105 of the transformer and the topological capacitors 106-113 to generate a high voltage 100 from the 1.5V supply 80.

Figure 5:
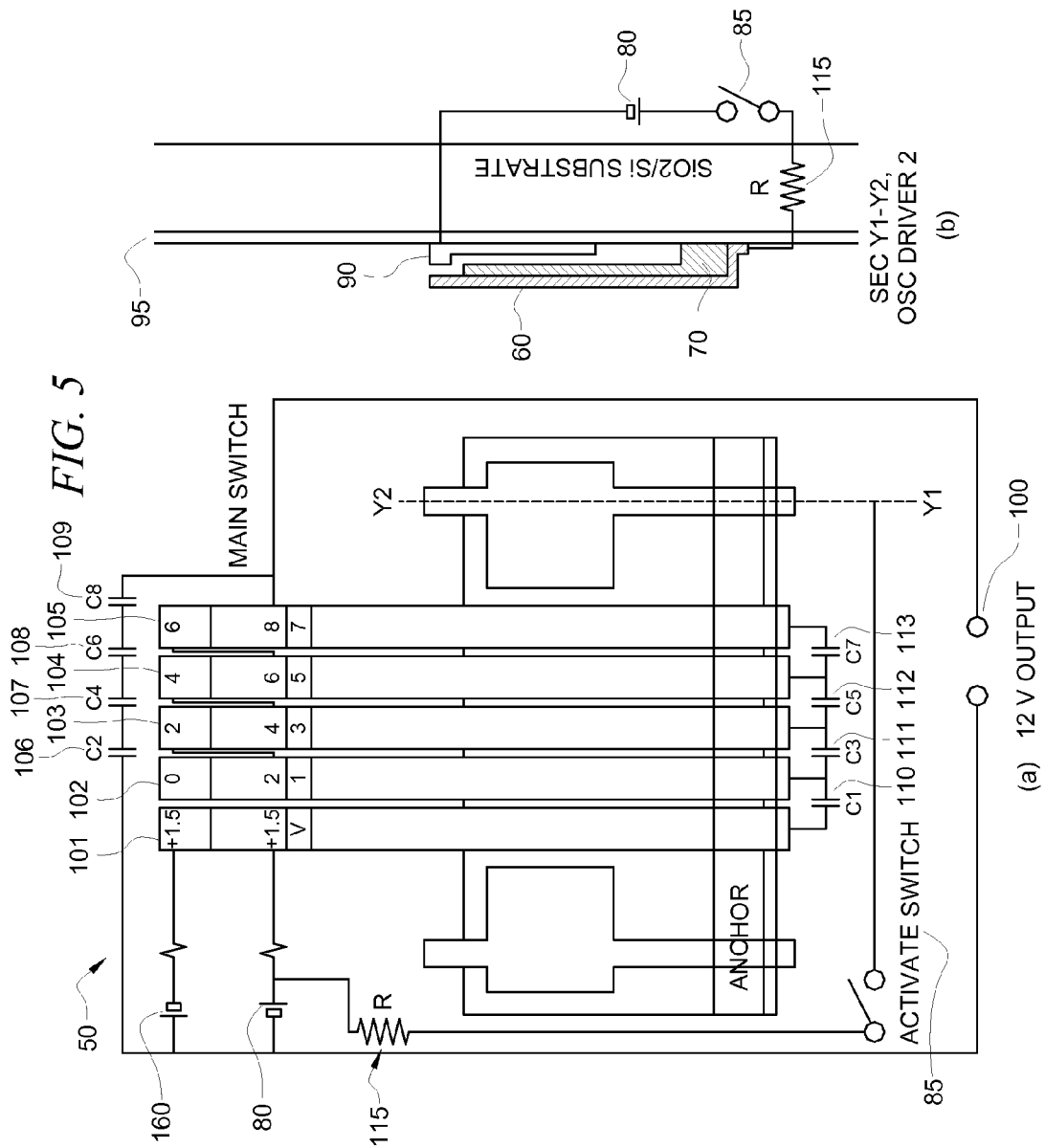
FIG. 5 is a diagrammatic view of an additional embodiment of the DC to DC transformer in accordance with the present invention employing an alternate oscillator driver.

In an additional embodiment of the oscillator driver 51, the charging contact 75 and the discharging contact 90 can be replaced by a series resistor 115 as shown with reference to FIG. 5. In this embodiment, the series resistor 115 is used to slowly charge the voltage on cantilever 60 until the pull-in voltage is achieved and the cantilever 60 snaps down and contacts the bottom electrode 90, making an electrical connection. Upon reaching this closed position, the cantilever 60 charges from the supply 80 and the voltage on the cantilever 60 is reduced to the voltage at the bottom electrode 90, at which point the electrostatic forces become zero and the cantilever 60 rebounds away from the switched-on position. The series resistor 115 continues to re-charge the cantilever 60 voltage toward pull-in and the process continues indefinitely or until the demand-activated switch 85 is turned off.

Figure 6:
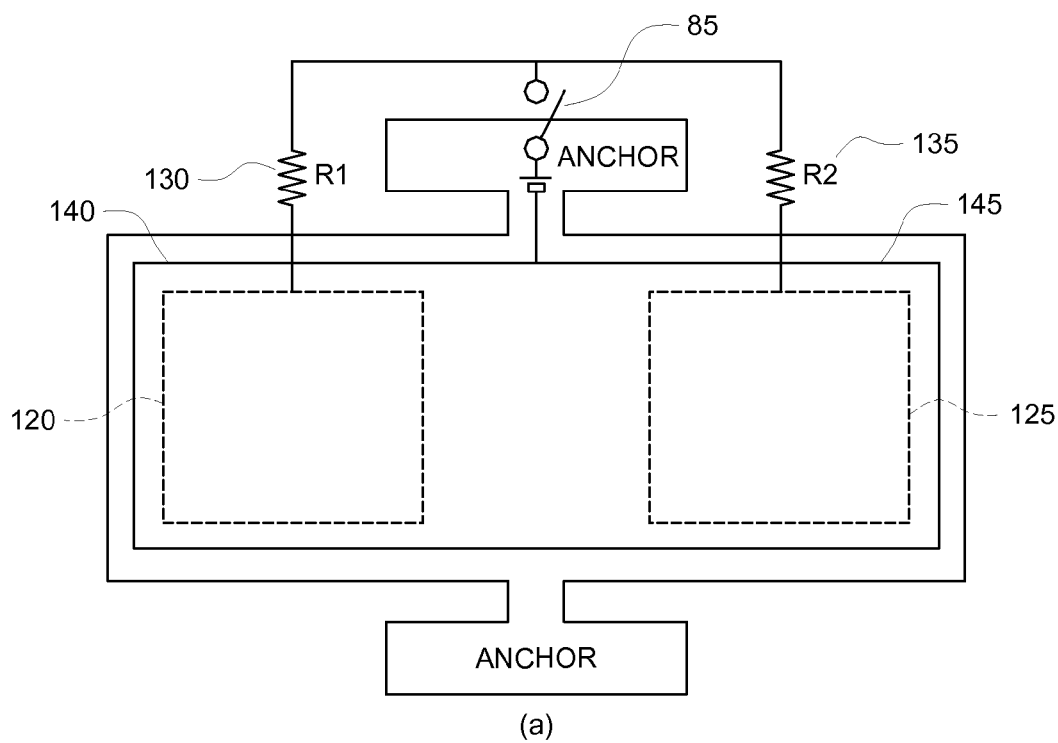
FIG. 6 is a diagrammatic view of an additional embodiment of the DC to DC transformer in accordance with the present invention employing a torsion oscillator driver.
Figure 6:
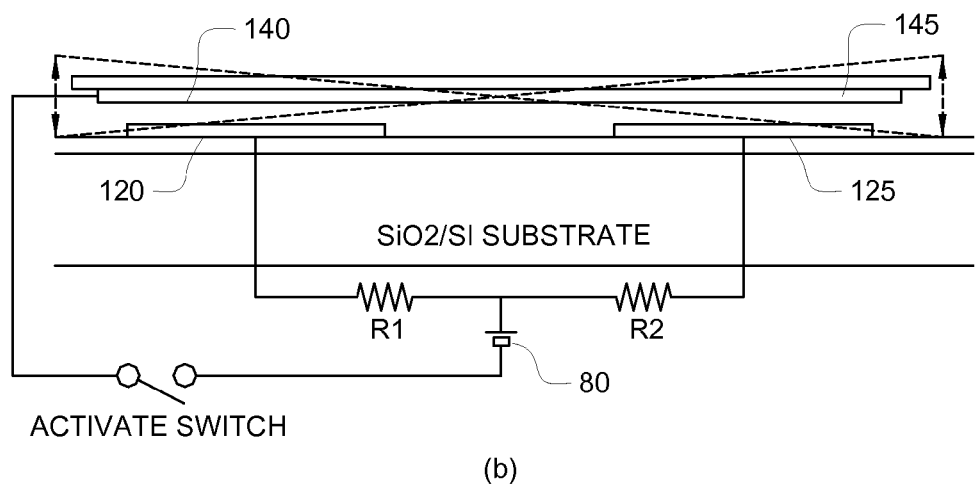

In yet another embodiment of the oscillator driver 51 in accordance with the present invention, a self-oscillating electromechanical configuration can be envisioned wherein a symmetric torsion device is used in place of a cantilever as shown in FIG. 6. In this embodiment, a ground potential is connected to the torsion device having a first end 140 and second end 145, and two pull-in pads 120, 125 are connected to the power source 80 through independent series resistors 130, 135 and a demand-activated switch 85. Upon closure of the demand-activated switch 85, the torsion second end 145 of the torsion device pulls toward the pull-in pad 125, eventually making an electrical connection. Upon making an electrical connection, the contacted pull-in pad 125 is discharged, reducing the electrostatic forces on that half of the torsion device 145 to zero. Since the alternate pull-in pad 120 is charged to a higher voltage potential, the first end 140 torsion device then tilts toward and eventually connects to that pad 120, at which point the pad 120 is discharged. Choosing appropriate values of the resistors 130, 135 and the device capacitance, and mechanical resonance, the oscillator driver utilizing a symmetric torsion device can continue to oscillate between the two switching sides 140, 145 of the torsion device indefinitely or until the demand-activated switch 85 is turned off. The torsion layout may be advantageous in that switching contacts are on all the same surface, which may simplify physical realization of the switch.

The DC to DC transformer 50 in accordance with the present invention includes a voltage multiplier which comprises a plurality of MEMS switches. Each of the plurality of MEMS switches are activated by the vibration of the oscillator driver and a plurality of charge storage capacitors are coupled to the plurality of MEMS switches to provide a high voltage output from an input voltage received at the oscillator driver.

With reference again to FIG. 4, in a particular embodiment of the present invention the voltage multiplier operates in similar fashion to a Cockcroft-Walton circuit. In this embodiment, a plurality of MEMS cantilevers 101, 102, 103, 104, 105 are integrated with the plurality of topological capacitors 106-113 which are used for charge storages for high voltage generation.

In the embodiment illustrated in FIG. 4(a) the main switch, or voltage multiplier, of the present invention consists of 5-circuits 2-poles. In the cross-sectional view of cantilever 102 of the main switch, (Y3-Y4) shown in FIG. 4(c) the moving metal cantilever 150 is supported by a more solid dielectric cantilever 155. This structure ensures that all five contacts of the five cantilevers will be on or off consistently.

The voltage multiplier main switch consists of two low voltage sources 80, 160 and 5-circuit 2-pole cantilever switches 101-105. Each cantilever switch has one extended Pt moving finger terminal 150 between the normally on upper contact 170 and the normally off bottom contact 175. The switches are connected as shown in the charge transfer converter in FIG. 3(a). In an additional embodiment, the circuit configuration may be modified to have 6-circuits, 2-poles switches and one low voltage source as shown in FIG. 3(b). The oscillator driver previously described generates vibration for activating the main switches of the voltage multiplier using an electrostatic force rather than magnetic force. Each switching motion of the main switches 101-105 causes the charge of each capacitor 106-113 to be transferred to the right side of the capacitors 106-113. The charge transfers left to right through each of capacitors 106-109 thereby reaching a full voltage of 3V within a few cycles. Thus, the output terminal voltage 100 reaches 12V. The array of main switches transfer charges and generates a high voltage output.

Figure 7:
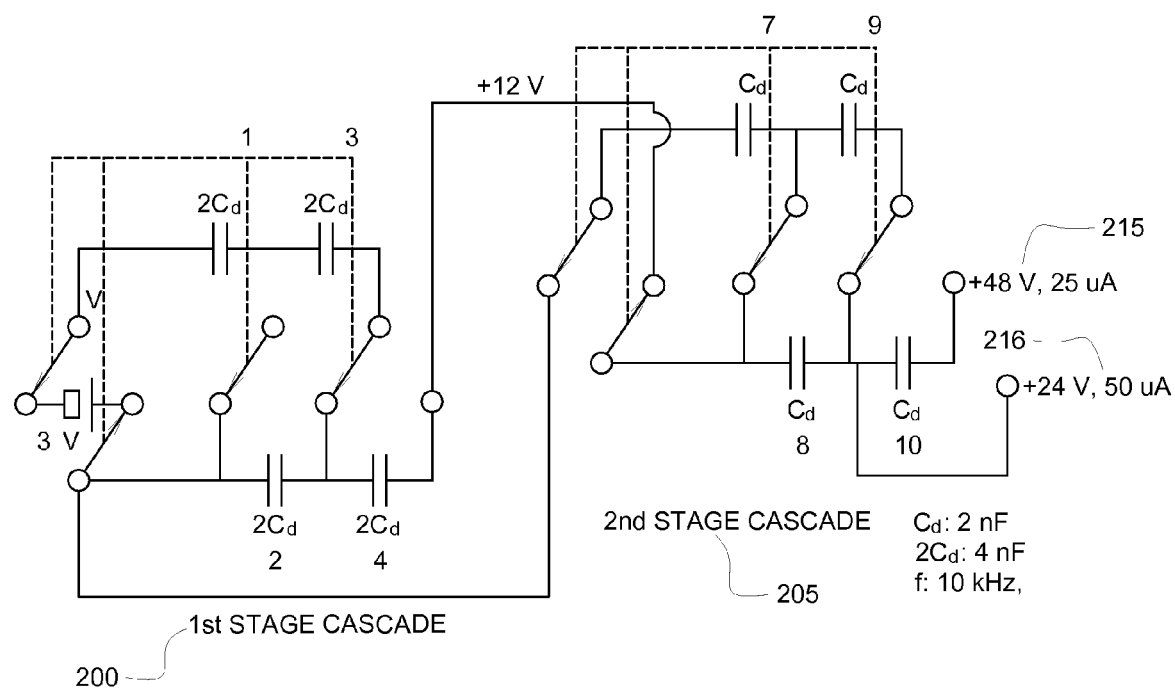
FIG. 7 is a diagrammatic view of an additional embodiment of the DC to DC transformer in accordance with the present invention illustrating the use of cascading main switches.

In an additional embodiment, a charge transfer converter in accordance with the present invention having a plurality of cascading stages is illustrated with reference to FIG. 7. In FIG. 7 it can be seen that a higher voltage level 215 or 216 can be attained by cascading a $1^{st}$ stage main switch 200 and a 2nd main switch 205.

The MEMS switches in accordance with the present invention may be employed in high voltage generating applications. Higher frequency switching is more desirable in such applications. Chattering is inevitable when the switching contact is made. Contact bounce, or chattering, is a common problem with mechanical switches and is caused by the momentum and elasticity of the switch. The chattering results in a rapidly pulsed electrical current instead of a clean transition from zero to full current resulting in damped sinusoidal oscillations. Hardware and software solutions are known in the art to eliminate or reduce this contact bounce.

Figure 8:
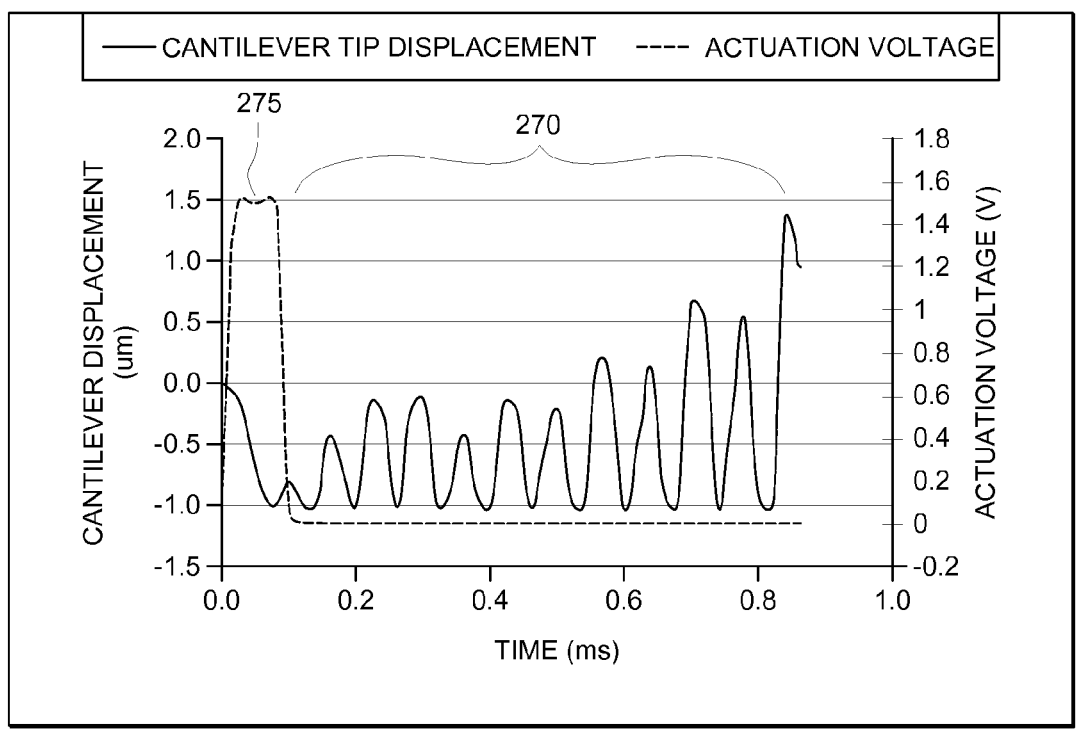
FIG. 8 is an illustration of the chattering motion of the cantilever in accordance with the present invention.

In most applications, chattering of the switch is considered a negative and undesirable effect; however, the chattering mode of switching can be very useful for high frequency switching using low frequency actuators. Switching synchronization can be achieved using MEMS devices because the uniform array can be fabricated utilizing a one batch process. Triggering of this chattering motion can be a result of, but not is limited to; a thermally activated vibration, a series of mechanical vibrations, an electrical current or voltage pulse, the motion of walking, or the wave motion of water. These motions have been analyzed by the finite element analysis as shown with reference to FIG. 8. More than ten additional clear switching motions 270 have been observed with one trigger motion 275. Thus, low frequency motion such as waves and the vibration associated with walking have been shown by the present invention to be useful for high voltage generations.

Figure 1:
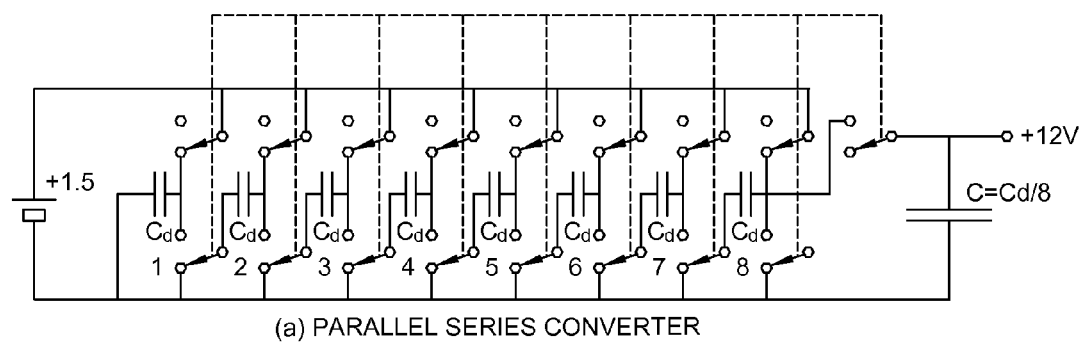
FIG. 1 is a diagrammatic view (a) a parallel series converter and (b) a charge transfer converter which are currently known in the art.
Figure 1:
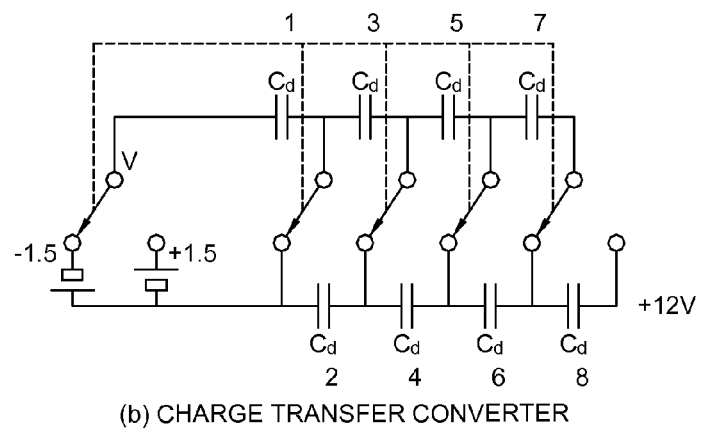
Figure 2:
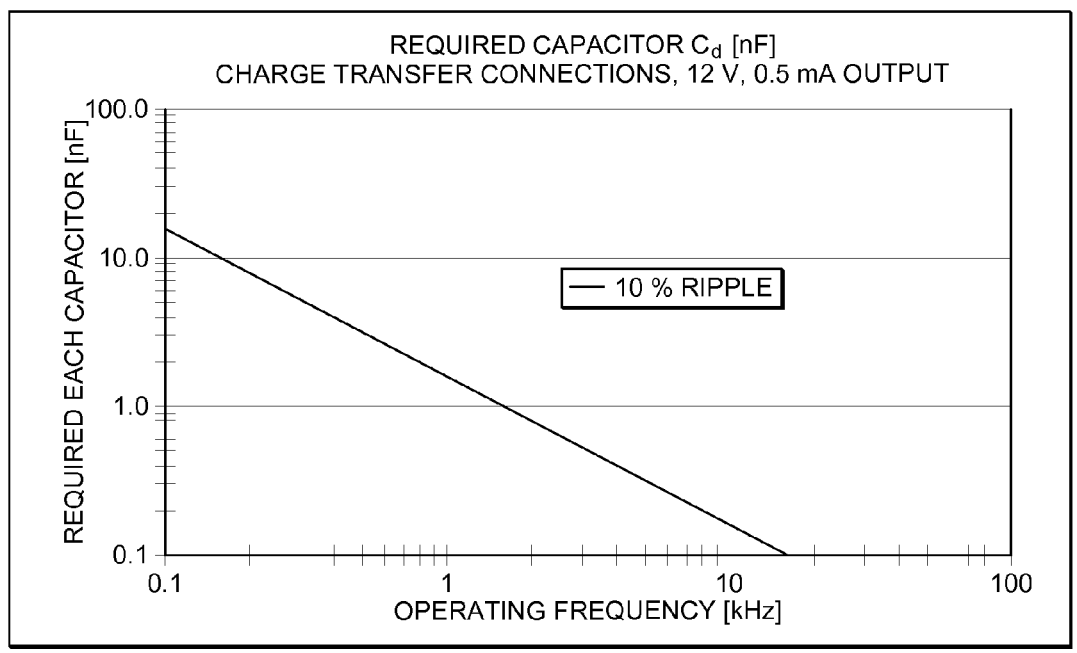
FIG. 2 is a graphical illustration of the Required Capacitor vs. Operating Switching Frequency for a switching circuit as is known in the art.
Figure 9:
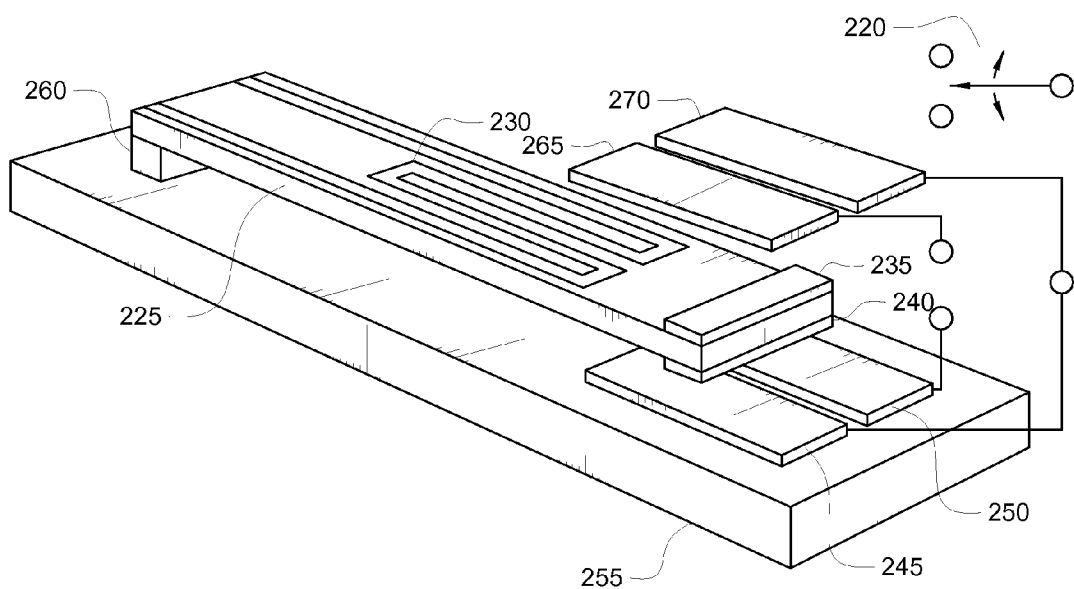
FIG. 9 is a diagrammatic view of a cantilever switching element in accordance with an embodiment of the present invention.

With reference to FIG. 9, a specific embodiment of the chattering frequency enhanced MEMS switch in accordance with the present invention is illustrated. With reference to FIG. 9, the MEMS switch in accordance with the present invention can be used as a 1-circuit, 2-pole switch 220. The device includes a cantilever beam 225 with a Ni—Cr heater element 230 positioned on the top surface of the cantilever beam and a pair of metal lower contact pieces 245, 250 fabricated on a thermal oxide coated silicon substrate 255. In a particular embodiment, the Ni—Cr heater 230 is deposited using photolithography on the silicon nitride (SiNx) cantilever beam 225. The cantilever 225 has an anchor 260 positioned on the substrate 255 and a top 235 and a bottom 240 platinum (Pt) contact. Another pair of upper Pt switch contacts 265, 270 is positioned on a lid cover facing the cantilever beam 225. Each pair of the switch contacts closes when contact with the cantilever is made. The cantilever needs a triggering action to generate the chattering action. In accordance with this embodiment, the thermal bimorph actuator 230 is one possible triggering action. When the Ni—Cr heater 230 is on, the cantilever 225 bends and contact 240 hits the lower switch contacts 265, 270 and bounces back such that the top contact 235 of the cantilever touches the pair of upper switch contacts 265, 270. This switching motion may repeat more than 10 times. The trigger action is not limited to that caused by the thermal bi-morph but mechanical vibrations, wave actions, or any vibrations, which generate chattering motions, are within the scope of the present invention. These low frequency motions could not be used previously without multiplying the frequencies. The MEMS cantilever switch requires only a small contact force for switching. While the force of contact is extremely small, it is enough force for the tiny mechanical switch to switch. As such, the use of the MEMS cantilever switch allows the incorporation of the chattering motion into the switch response which enhances the frequency response of the switch. The faster motion with frequencies higher than 10 kHz can be achieved with the single trigger of FIG. 9, in accordance with the present invention. The use of the chattering motion also reduces the required values of the capacitors as shown in FIG. 2. The smaller value capacitors require a smaller surface area. Thus, greater integration of the device will be achieved.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. Now that the invention has been described,

What is claimed is:

1. A microelectromechanical system (MEMS) high speed DC converter, comprising:
    an actuator;
    at least one MEMS cantilever coupled to the actuator, the actuator to induce a chattering vibration of the at least one MEMS cantilever; and
    a voltage multiplier coupled to the at least one MEMS cantilever, the voltage multiplier comprising a plurality of MEMS cantilever switches and a plurality of charge storage capacitors coupled to the plurality of MEMS cantilever switches, the plurality of MEMS cantilever switches being activated by the chattering vibration of the at least one MEMS cantilever to provide a voltage output from the voltage multiplier.

2. The converter of claim 1, wherein the actuator is selected from the group consisting of a thermal actuator, a mechanical actuator, an electrical actuator, a walking motion actuator and a wave motion actuator.

3. The converter of claim 1, wherein the MEMS cantilever further comprises a cantilever beam positioned on a silicon substrate.

4. The converter of claim 3, wherein the actuator further comprises a Ni—Cr heater element positioned on the cantilever beam.

5. The converter of claim 3, wherein the cantilever beam is a SiNx cantilever.

6. The converter of claim 3, wherein the cantilever beam further comprises a top contact positioned on a top edge of the beam and a bottom contact positioned on a bottom edge of the beam.

7. The converter of claim 6, wherein the MEMS cantilever further comprises a pair of lower switch contacts positioned on the silicon substrate beneath the bottom contact.

8. The converter of claim 6, wherein the MEMS cantilever further comprises a pair of upper contact switch contacts positioned above the top contact.

9. The converter of claim 6, wherein the top contact and the bottom contact are platinum (Pt).

10. The voltage converter of claim 1, further comprising a demand activated switch to activate the actuator.

11. The converter of claim 1, wherein the plurality of MEMS cantilever switches and the plurality of charge storage capacitors form a Cockcroft-Walton circuit that switches charges between the capacitors and generates the voltage output.

12. The converter of claim 1, wherein the plurality of charge storage capacitors are topological capacitors.

13. A method of providing a DC to DC high voltage output from a low frequency actuation, the method comprising the steps of:
    providing a source of actuation
    inducing a chattering vibration of at least one MEMS cantilever coupled to the actuation source; and
    activating a voltage multiplier with the chattering vibration of the MEMS cantilever, the voltage multiplier comprising a plurality of MEMS cantilever switches and a plurality of charge storage capacitors coupled to the plurality of MEMS cantilever switches, the plurality of MEMS cantilever switches activated by the chattering vibration of the at least one MEMS cantilever to provide a high voltage output from the voltage multiplier.

14. The method of claim 13, wherein the source of actuation is provided by the group consisting of a thermally activated vibration, a mechanical vibration, an electrical vibration, a walking motion vibration and a wave motion vibration.

15. The method of claim 13, wherein the plurality of MEMS cantilever switches and the plurality of charge storage capacitors of the voltage multiplier form a Cockcroft-Walton circuit that switches charges between the capacitors and generates the voltage output.

16. The method of claim 13, wherein the charge storage capacitors are topological capacitors.

* * * * *